Feb. 2, 1971  W. G. RYCZEK  3,560,133
GRAIN BIN UNLOADER
Filed July 28, 1969
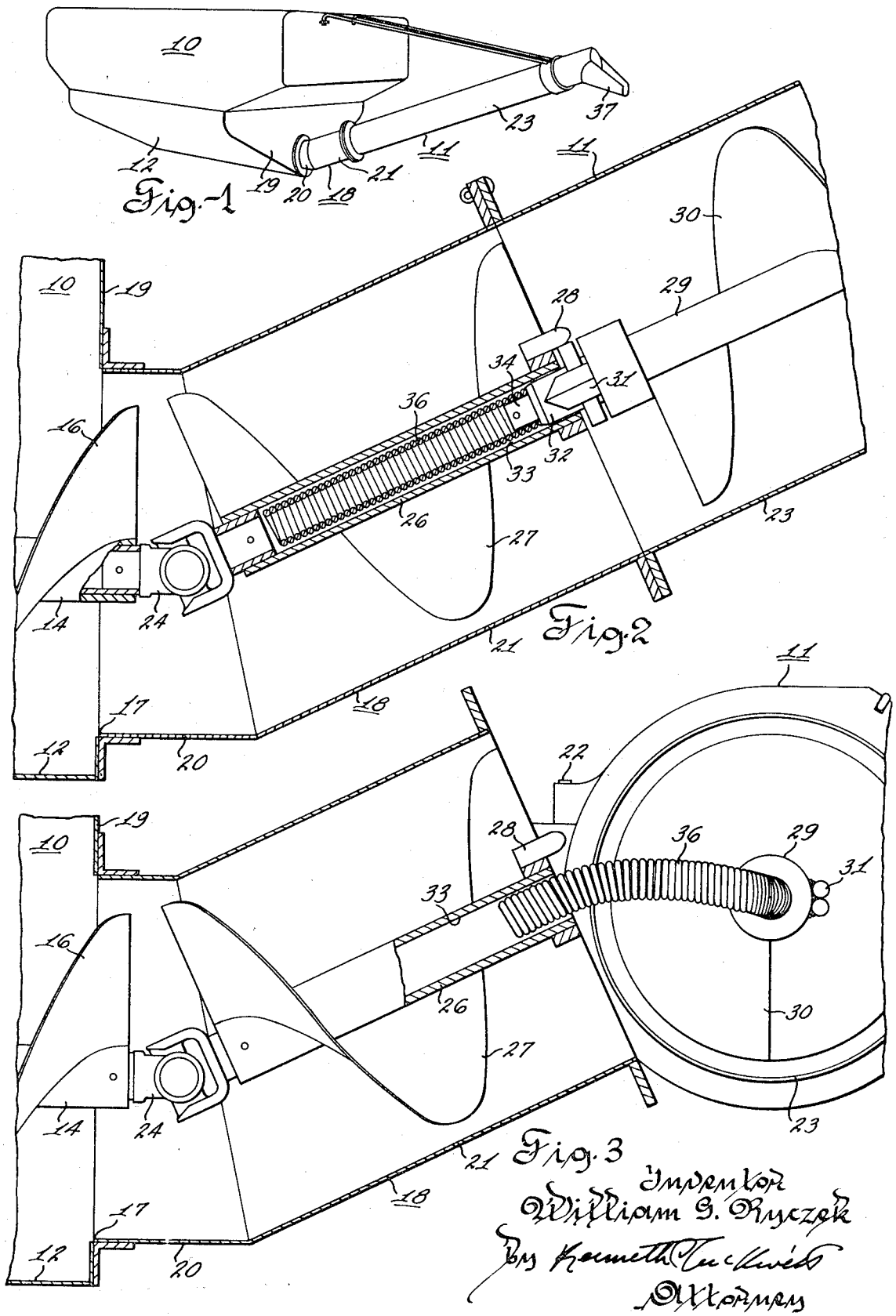

United States Patent Office 3,560,133
Patented Feb. 2, 1971

3,560,133
GRAIN BIN UNLOADER
William George Ryczek, Kansas City, Mo., assignor to Allis-Chalmers Manufacturing Company, Milwaukee, Wis.
Filed July 28, 1969, Ser. No. 845,294
Int. Cl. B60p 1/42
U.S. Cl. 214—522    6 Claims

ABSTRACT OF THE DISCLOSURE

A foldable auger provided with a spirally wound spring-like member attached at one end thereof to the central portion of an auger shaft of a swingable auger with the other end of the springlike member being slidably received within the hollow shaft of the nonswinging auger for guiding said swinging auger into engagement with the nonswinging auger when moving same to operative position.

---

This invention relates to combine harvesters and more particularly with an improved folding type auger conveyor for the handling of harvester material such as grain.

An object of this invention is to provide in a grain bin unloading auger which can be swung from a stowed position to an operating position of mechanism for self-alignment of a driving connection between separable portions of such auger.

A further object of this invention is to provide a self-aligning mechanism for portions of a foldable auger conveyor making it possible to utilize power means for aligning said conveyor in operative position.

It is a further object of this invention to provide self-aligning mechanism for portions of a foldable auger conveyor wherein such mechanism is simple, inexpensive and can be readily installed in prior art machines lacking a self-aligning mechanism.

These and other objects of invention will become more apparent as the following description describes in detail the invention comprehended.

Referring to the drawings:

FIG. 1 is an isometric view of a combine harvester grain tank and unloading auger embodying the invention shown in grain unloading position;

FIG. 2 is a side elevation of a portion of the tank and conveyor shown in FIG. 1 with the conveyor shown in section for purposes of clarity of illustration;

FIG. 3 is a view similar to FIG. 2 but with the conveyor shown in stowed position.

Referring to the drawing the present invention is an improvement over the construction shown in U.S. Pat. 2,783,906, issued Mar. 5, 1957, and if more details of the background construction of the present invention are desired, reference is hereby made to such patent.

In FIG. 1, a grain tank 10 is shown which can be mounted on a combine harvester (not shown) and an auger conveyor 11 would be driven by power means (not shown) of such harvester. Tank 10 is open at its top and is adapted to receive grain, or the like from an elevator from the thresher (not shown) while the combine harvester is traveling through a field and harvesting. This tank has a floor or bottom 12 which slopes from the left downwardly toward the right as shown in FIG. 1. The low portion of the tank locates a transverse shaft 14 (see FIG. 2) formed with an auger or screw spiral 16 whose depth of spiral is uniform across the bottom of the tank. Tank 10 has a discharge opening 17 from which extends a pipe 18 made fast to wall 19 of the tank. This pipe 18 extends outwardly horizontally for a short portion 20 and then bends upwardly and outwardly in the adjoining portion 21. Portion 21 is of short length and has hingedly connected thereto by a hinge 22 (see FIG. 3), an outwardly and upwardly extending long discharge elevator pipe 23. The outer end of shaft 14 has one end of a universal joint 24 attached thereto, the other end of the universal joint being attached to hollow shaft 26 positioned in short pipe 18. Flighting 27 is attached to the periphery of shaft 26. A dog 28 is attached to the periphery of the outer end of shaft 26.

Referring to FIG. 2 which shows pipe 23 forming an extension of pipe 21, a shaft 29 is coaxially mounted in pipe 23 by bearing means (not shown) positioned adjacent the upper end of pipe 23. Shaft 29 has auger flighting 30 attached to the periphery thereof. The lower end of shaft 29 has a dog 31 attached thereto. Also attached to the lower end of shaft 29 is a centrally disposed plug member 32 which is slidably received in the hollow center 33 of shaft 26. Plug member 32 is provided with a stepped down portion 34 upon which is attached a spirally wound wire element 36. Element 36 is slidably received within the hollow center 33 of shaft 26 but is not attached thereto.

Referring to FIG. 3 which shows elevator pipe 23 positioned in transport or nonoperative position, it is seen that when elevator pipe 23 is moved to inoperative or stowed position, pipe 23 is pivoted on hinge 22, driven dog 31 moves out of contact with drive dog 28 and spirally wound wire element 36 is partially withdrawn from passage 33 in shaft 26.

As movable elevator pipe 23 is moved from the stowed position shown in FIG. 3, the spirally wound wire element 36 moves back into the hollow center 33 of the shaft 26 thus causing the two conveyor ends to be properly aligned with dog 28 opposing dog 31 and plug 32 being received within hollow portion 33 to align shafts 26 and 29. The drive from shaft 14 will now be as follows: Shaft 14 will drive universal joint 24 which drives shaft 26 and dog 28 attached thereto. Dog 28 drives dog 31 and shaft 29 attached thereto and accordingly flighting 16 moves grain from bin bottom 12 to auger flighting 27 which moves the grain to auger flighting 30 which discharges the grain from the upper end of tube 23 onto spout 37 as shown in FIG. 1.

From the foregoing it is seen that by providing a simple spiral centering element 36, it is possible to eliminate bearings, gears, etc., which are used in the prior art and because this centering device aligns the two auger sections properly just by swinging section 23 on its hinge 22 it is possible to use power means to do this swinging whereas, in the prior art, the swinging had to be done by hand to make sure that all parts aligned properly.

The embodiments of the invention in which an exclusive property or privilege is claimed are defined as follows:

1. In a combine having a grain bin and a foldable auger cvonveyor for unloading the bin, said foldable auger conveyor including a short auger conveyor carried by said grain bin and being operatively connected thereto for moving grain from said bin, a long auger conveyor pivotally connected to said short conveyor for forming an operative extension thereof or for being positioned alongside said bin in transport position, said short auger conveyor and said long auger conveyor including central shafts to which auger flighting is attached, one of said central shafts being hollow, the improvement comprising an elongated spirally wound wire member having one end attached to an end of the other of said shafts and the other end of said wire member being slidably received within the hollow portion of said one shaft.

2. In the combination recited in claim 1 and wherein said one shaft being the shaft of said short auger conveyor.

3. In the combination recited in claim 2 and wherein said spirally wound wire member is of such a length that the unattached end of said wire member is still retained in the hollow shaft of the short auger when the long auger conveyor has been pivoted to inoperative position.

4. In the combination recited in claim 1 and wherein said other shaft being the shaft of said long auger conveyor.

5. In the combination recited in claim 3 and wherein said long auger conveyor shaft is provided with a plug at one end coaxial with said shaft and said wirelike member is attached to a stepped down portion of said plug for guiding said plug into the hollow shaft of said short auger conveyor when said long auger conveyor is moved to operative position.

6. In the combination recited in claim 5 and wherein said plug is dimensioned to slide into the hollow shaft of said short auger conveyor for aligning said shafts.

References Cited

UNITED STATES PATENTS

| 2,585,414 | 2/1952 | Steffens | 214—83.32X |
| 2,772,767 | 12/1956 | Seifert | 198—213X |

ALBERT J. MAKAY, Primary Examiner

U.S. Cl. X.R.

214—83.26, 83.32; 198—64, 213